March 21, 1939.   B. W. JONES   2,151,553

MOTOR CONTROL SYSTEM

Original Filed May 21, 1936

Inventor:
Benjamin W. Jones,
by Harry E. Dunham
His Attorney.

Patented Mar. 21, 1939

2,151,553

UNITED STATES PATENT OFFICE 2,151,553

MOTOR CONTROL SYSTEM

Benjamin W. Jones, Schenectady, N. Y., assignor to General Electric Company, a corporation of New York Application May 21, 1936, Serial No. 81,048
Renewed November 25, 1938

6 Claims. (Cl. 171—118)

My invention relates to motor control systems and particularly to systems for controlling the application of direct current excitation to a synchronous motor field winding.

One object of my invention is to provide an improved arrangement of apparatus for connecting a synchronous motor field winding to a source of excitation so that the motor can pull its maximum load into step upon the application of direct current excitation to the field winding without substantial surges occurring in the motor armature current due to the motor slipping one or more poles during the synchronizing operation.

It has been demonstrated that the amount of load which a motor can pull into step depends upon the particular point in the cycle of slip frequency current induced in the motor field circuit at which the excitation is applied and that the motor can pull into step its maximum load when the excitation is applied substantially at the instant when the half-wave of induced current flowing through the motor field winding in the negative direction reaches zero. Due to the operating time of the field switch and the time constant of the excitation circuit, it is necessary to initiate the closing operation of the field switch at a point in the cycle of induced field current prior to the point at which the excitation is applied. In United States Letters Patent No. 1,958,250, granted May 8, 1934, on an application filed by Harold T. Seeley, and assigned to the same assignee as this application, there is disclosed an arrangement whereby the excitation may be applied at a point in the slip cycle of induced field current shortly after the most favorable point. This arrangement consists of a series-connected half-wave rectifier and relay in shunt to a portion of the field discharge resistance. In order to cause the arrangement disclosed in the aforesaid patent to effect the application of excitation at the most favorable point in the cycle of induced field current, I find that I can accomplish the desired result by connecting a suitable reactance, such as a capacitor, of the proper size in shunt with the half-wave rectifier so as to shift the phase of the current in the relay relative to the current in the field winding.

Figure 1:
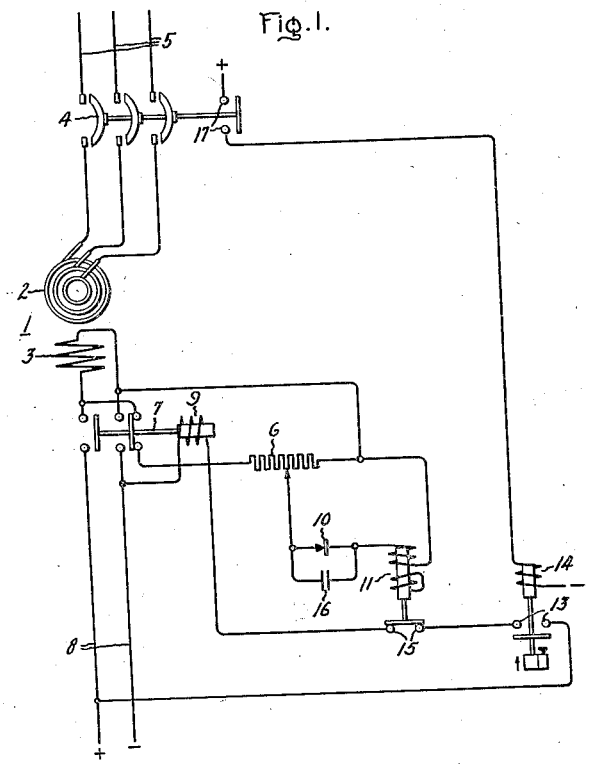
Figure 2:
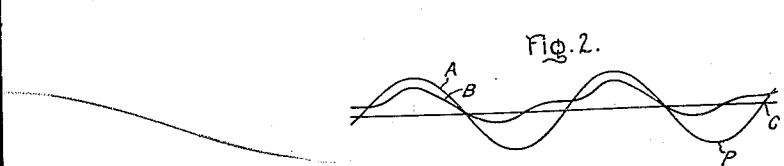

My invention will be better understood from the following description when taken in connection with the accompanying drawing, Fig. 1 of which diagrammatically shows a synchronous motor starting system embodying my invention; Fig. 2 of which shows explanatory curves, and Fig. 3 of which is a modification of a portion of the embodiment of my invention shown in Fig. 1, and its scope will be pointed out in the appended claims.

Referring to Fig. 1 of the accompanying drawing, 1 represents a synchronous motor which is provided with an armature winding 2 and a field winding 3. In order to simplify the disclosure, I have shown my invention in connection with a full voltage starting arrangement for a synchronous motor so that it is started by connecting the armature winding 2, by means of a suitable manually controlled switch 4, directly across an alternating current supply circuit 5 while the field winding 3 is short-circuited through a discharge resistor 6. Therefore, normal supply circuit voltage is applied to the motor armature winding to start the motor as an induction motor. In practice, the motor also will have a squirrel cage winding, which is not shown. While I have shown a full voltage starting arrangement, it will be understood that any other well known synchronous motor starting equipment may be employed to start the motor from rest and accelerate it to approximately synchronous speed.

The connection of the field winding 3 to the discharge resistor 6 is completed by means of a two-position field switch 7 when it is in the position shown in the drawing. When the switch 7 is in its other position, the discharge resistor 6 is disconnected from the field winding 3 and the field winding 3 is connected to a suitable source of excitation 8. Switch 7 is provided with an operating winding 9 which, when energized, moves the switch 7 from the position in which it is shown to its other position, in which the source of excitation 8 is connected to the field winding 3. For controlling the energization of the operating winding 9 of the field switch 7, a half-wave rectifier 10 and the operating winding of a relay 11 are connected in series across a portion of the field discharge resistor 6. Preferably, the relay 11 is of the type having a counter-jacketed winding so that it does not close its contacts until after the current in the operating winding has remained below a predetermined value for a predetermined time.

In order to prevent the field switch 7 from being closed when the switch 4 is open, the circuit of the closing coil 9 of the field switch 7 also includes the contacts 13 of a time relay 14, which is arranged to be energized to close its contacts 13 after the switch 4 has been closed a predetermined time. As shown in the drawing, this result is accomplished by providing the circuit of the winding of the relay 14 with contacts 17 which are arranged to be closed by the switch 4 when it is in its closed position.

In order to cause the relay 11 to close its contacts 15 in the circuit of the operating winding 9 of the field switch 7 at the most favorable point in the slip cycle of induced field current, I connect in the particular embodiment of my invention shown in the drawing a capacitor 16 in parallel with the half-wave rectifier 10. This capacitor 16 causes a phase displacement of the current in the operating winding of the relay 11 relative to the current in the field winding during the half-wave of induced field current that does not flow through the rectifier 10. By using a capacitor 16 which has the proper value of capacity, I find that the relay 11 can be made to close its contacts 15 at any desired point within a wide range prior to the point in the cycle of induced field current where the current in the negative direction reaches zero.

The operation of the arrangement shown in Fig. 1 is as follows: When it is desired to start the motor, the switch 4 is closed so that the full voltage of the supply circuit 5 is applied to the armature winding 2 to start the motor 1 from rest and accelerate it to approximate synchronous speed. As soon as the motor armature winding 2 is energized, a voltage of slip frequency is induced in the motor field winding 3 and this voltage causes a current of slip frequency to flow through the field winding 3 and the discharge resistor 6. Also a portion of the slip frequency current flows through the operating winding of the relay 11, the rectifier 10, and the capacitor 16. When the slip frequency current in the field winding is flowing in one direction, an appreciable amount of slip frequency current flows in the same direction through the rectifier 10 and the operating winding of the relay 11 since the rectifier 10 substantially short-circuits the capacitor 16. However, when the slip frequency current is flowing in the opposite direction through the field winding 3 only a small current flows through the series connected capacitor 16 and the operating winding of the relay 11. Not only is the magnitude materially decreased, but also, due to the capacitor, the slip frequency current flowing through operating winding of the relay 11 passes through zero before the slip frequency current flowing through the field winding does. This will be seen more clearly from Fig. 2, in which curve A represents the slip frequency current flowing through the field winding and curve B represents the slip frequency current flowing through that portion of the discharge circuit that includes the operating winding of the relay 11. It will be seen from these curves that when the induced field current is in the negative direction, the current through the operating winding of the relay 11 is out of phase with the current in the field winding 3 and that the reduced induced field current in the operating winding of relay 11 passes through zero and builds up in the positive direction before the current in the field winding in the negative direction decreases to zero.

The magnitude and frequency of the current through the operating winding of the relay 11 are such that the relay picks up at the instant of starting and maintains its contacts 15 open until the motor reaches substantially synchronous speed. A predetermined time after the switch 4 closes, the relay 14 closes its contacts 13 in the circuit of the closing coil 9 of the field switch 7. The relay 14 is normally set so that it does not close its contacts 13 until sufficient time has elapsed for the relay 11 to open its contacts 15.

During each of the half cycles of induced field current which is blocked by the rectifier 10, a small current flows through the capacitor 16 and the operating winding of relay 11. Due to the capacitor 16, this small current through relay 11 is in a direction to demagnetize the relay during a portion of this half-cycle of current in the field winding. When this demagnetizing current is of sufficient duration the relay 11 drops out at the point on the cycle of relay current where the demagnetizing current becomes zero. It is evident that, due to this demagnetizing action, the relay will drop out at an earlier point on the curve A in Fig. 2 than when no additional demagnetizing action is present. That is, the capacitor 16 has the effect of shifting the point at which the relay 11 drops out from the point C where the relay would drop out if no capacitor were used to a prior point, such as P, in the cycle of induced field current.

Until the motor reaches a predetermined speed, the frequency of the induced field current is so high that the demagnetizing action of the current through the capacitor 16 and operating winding of the relay 11 does not last long enough to allow the relay 11 to drop out. However, when this predetermined speed is reached, the duration of the demagnetizing current is long enough to cause the relay 11 to drop out and close its contacts 15, thereby completing an energizing circuit for the closing coil 9 of the field switch 7. The switch 7 then operates to connect the motor field winding to the source of excitation so that the motor is pulled into synchronism and also operates to open the discharge circuit through the resistor 6.

By employing different sizes of capacitors 16, the relay 11 can be made to close its contacts 15 at different points P prior to the point C where the induced field current passes through zero. In this manner, by properly setting the relay 11, I am able to cause the field to be applied to the motor at the most favorable point in the cycle of induced field current.

Figure 3:
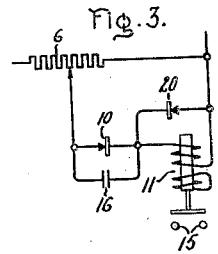

In the modification shown in Fig. 3, I have shown a half-wave rectifier 20 in parallel with the operating winding of the relay 11 and in series with the rectifier 10, but arranged to rectify the opposite half-wave. The rectifier 20 takes the charging current of the capacitor 16 from the relay winding.

While I have, in accordance with the patent statutes, shown and described my invention as applied to a particular system and as embodying various devices diagrammatically indicated, changes and modifications will be obvious to those skilled in the art, and I, therefore aim in the appended claims to cover all such changes and modifications as fall within the true spirit and scope of my invention.

What I claim as new and desire to secure by Letters Patent of the United States is:

1. In combination, a synchronous motor having a field winding, a source of excitation, a discharge circuit connected to said field winding, means for connecting said source to said field winding, means for causing each half-cycle of induced field current of a predetermined direction to flow for a shorter length of time in a predetermined portion of said discharge circuit than it does in another portion, and means controlled by the duration of the current in said predetermined portion of said discharge circuit for initiating the operation of said connecting means.

2. In combination, a synchronous motor having a field winding, a source of excitation, a discharge circuit connected to said field winding, said circuit including two parallel portions, means for connecting said source to said field winding, means for causing each half-cycle of induced field current of a predetermined direction to flow for a shorter length of time in one of said parallel portions than it does in the other parallel portion, and means controlled by the duration of the current in said one of said parallel portions for initiating the operation of said connecting means.

3. In combination, a synchronous motor having a field winding, a source of excitation, a discharge resistor connected to said field winding, a time relay connected in parallel with said resistor, a half-wave rectifier connected in series with said relay, a capacitor connected in shunt to said rectifier, and means controlled by said relay for connecting said field winding to said source of excitation.

4. In combination, an electric motor a circuit having a plurality of parallel connected portions, means for causing variable frequency current to flow through said circuit as the speed of said motor varies, means for causing each half-cycle of current of a predetermined direction in said circuit to flow for a shorter length of time in one of said parallel portions than it does in the other parallel portion, a time relay having an operating winding energized by the current in said one of said parallel portions, and means controlled by said relay for establishing predetermined circuit connections for said motor.

5. In combination, an electric motor a circuit having a plurality of parallel connected portions, means for causing variable frequency current to flow through said circuit as the speed of said motor varies, a half-wave rectifying means in one of said parallel portions of said circuit, a relay having an operating winding in series relation with said one of said parallel portions and a short-circuited winding in inductive relation with said operating winding, a capacitor connected in parallel with said rectifying means in said one of said parallel portions, and means controlled by said relay for establishing predetermined circuit connections for said motor.

6. In combination, a synchronous motor having a field winding, a source of excitation, a discharge resistor connected to said field winding, a half-wave rectifier connected in parallel with said resistor, a relay having an operating winding connected in series with said rectifier and a short-circuited winding in inductive relation with said operating winding, means for causing an out-of-phase demagnetizing current of slip frequency to flow through said operating winding during the half-wave of field current which is blocked by said rectifier, and means controlled by said relay for establishing predetermined circuit connections for said motor.

BENJAMIN W. JONES.